US008977765B1

(12) United States Patent
Patel et al.

(10) Patent No.: US 8,977,765 B1
(45) Date of Patent: Mar. 10, 2015

(54) METHOD AND APPARATUS FOR STREAMING APPLICATIONS TO A PLURALITY OF CLIENTS WITHIN A PEER TO-PEER NETWORK

(75) Inventors: Meena Patel, Pune (IN); Basant Rajan, Pune (IN)

(73) Assignee: Symantec Corporation, Mountain View, CA (US)

( * ) Notice: Subject to any disclaimer, the term of this patent is extended or adjusted under 35 U.S.C. 154(b) by 437 days.

(21) Appl. No.: 12/395,229

(22) Filed: Feb. 27, 2009

(51) Int. Cl.
*G06F 15/16* (2006.01)

(52) U.S. Cl.
USPC .......................................... 709/231; 709/218

(58) Field of Classification Search
USPC ................................. 709/201–203, 217–232
See application file for complete search history.

(56) References Cited

U.S. PATENT DOCUMENTS

| 7,421,708 B2* | 9/2008 | Vass et al. ...................... 719/320 |
| 7,546,337 B1* | 6/2009 | Crawford ...................... 709/203 |
| 7,555,531 B2* | 6/2009 | Teodosiu et al. ............. 709/217 |
| 2003/0182373 A1* | 9/2003 | Soto et al. ..................... 709/204 |
| 2004/0255027 A1* | 12/2004 | Vass et al. ..................... 709/226 |
| 2008/0109446 A1* | 5/2008 | Wang .............................. 707/10 |
| 2009/0300673 A1* | 12/2009 | Bachet et al. .................. 725/31 |
| 2009/0327505 A1* | 12/2009 | Rao et al. ...................... 709/230 |

* cited by examiner

*Primary Examiner* — Yasin Barqadle
(74) *Attorney, Agent, or Firm* — Wilmer Cutler Pickering Hale and Dorr LLP

(57) ABSTRACT

A method and apparatus for streaming applications to a plurality of clients within a peer-to-peer network is provided. In one embodiment, a method for distributing application blocks to facilitate application streaming within a peer-to-peer network includes processing location information regarding a plurality of data chunks amongst a plurality of clients, wherein the plurality of data chunks form at least a portion of an application block and communicating the location information amongst the plurality of clients, wherein the location information is used to request at least one data chunk of the plurality of data chunks.

19 Claims, 3 Drawing Sheets

METHOD AND APPARATUS FOR STREAMING APPLICATIONS TO A PLURALITY OF CLIENTS WITHIN A PEER TO-PEER NETWORK

BACKGROUND

1. Field of the Invention

Embodiments of the present invention generally relate to application distribution and, more particularly, to a method and apparatus for streaming applications to a plurality of clients within a peer-to-peer network.

2. Description of the Related Art

A typical computing environment may include one or more clients and servers. Furthermore, the one or more clients may form a portion of a peer-to-peer network. Generally, the server includes various computer resources, such as data processing resources, network resources, data storage resources, software resources and/or the like. As such, one or more clients utilize the various computer resources during normal computer operations. Occasionally, one or more clients request access to the various computer resources through a networked computer system. For example, the clients may request access to file data from the server. The data may be arranged in one or more files that may be communicated to each of the clients that requested the file.

However, during various operations that require application transfer, such as an application initiation, an update or a patch installation, and/or the like, the server provides the blocks associated with the application to each of the clients. Further, such operations require the server to provide identical blocks to each of the clients at approximately the same time. Because data is communicated to various clients at approximately the same time, network congestion may occur and thereby a degradation of an operational performance of the associated application occurs. Further, such data transfers may require additional computer resources that are drawn from the network, and therefore cause a degradation of overall network performance.

Therefore, there is a need in the art for a method and apparatus for streaming applications to a plurality of clients within a peer-to-peer network.

SUMMARY OF THE INVENTION

Embodiments of the present invention comprise a method and apparatus for streaming applications to a plurality of clients within a peer-to-peer network. In one embodiment, a method for distributing application blocks to facilitate application streaming within a peer-to-peer network includes processing location information regarding a plurality of data chunks amongst a plurality of clients, wherein the plurality of data chunks form at least a portion of an application block and communicating the location information amongst the plurality of clients, wherein the location information is used to request at least one data chunk of the plurality of data chunks.

DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
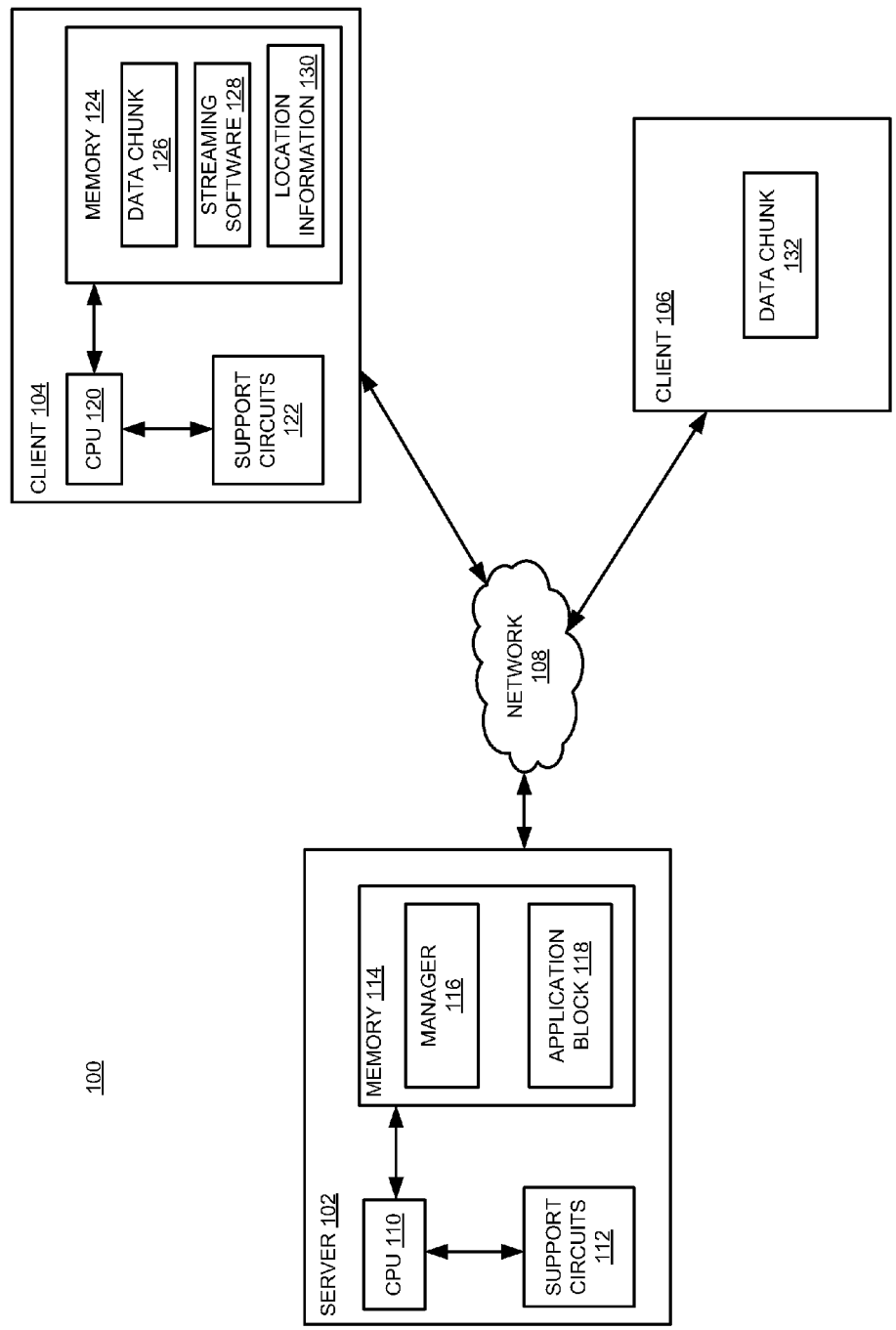
FIG. 1 is a block diagram of a system for streaming files to a plurality of clients within a peer-to-peer network according to one or more embodiments of the invention.

FIG. 1 is a block diagram of a system 100 for streaming files to a plurality of clients according to one or more embodiments of the invention. The system 100 includes a server 102 and a plurality of clients, such as a client 104, a client 106, where each is coupled to other through a network 108. Furthermore, the client 104 and/or the client 106 may form at least a portion of a peer-to-peer network, such as those generally known in the art.

The server 102 is a type of computing device (e.g., a laptop, a desktop, a Personal Digital Assistant (PDA), a mobile phone and/or the like), such as those generally known in the art. The server 102 includes a Central Processing Unit (CPU) 110, various support circuits 112 and a memory 114. The CPU 110 may comprise one or more commercially available microprocessors or microcontrollers that facilitate data processing and storage. The support circuits 112 facilitate the operation of the CPU 110 and include one or more clock circuits, power supplies, cache, input/output circuits, and the like. The memory 114 comprises at least one of Read Only Memory (ROM), Random Access Memory (RAM), disk drive storage, optical storage, removable storage and/or the like. The memory 114 includes various software packages, such as a manager 116.

Furthermore, the memory 114 includes various application blocks, such as an application block 118. Generally, the application block 118 is configured to store data associated with one or more on-demand applications services. The application block 118 may be required at a client of the plurality of clients to install, update and/or operate an application. The application block 118 may be streamed to the client 104 and/or the client 106 as a portion of an application data file, an installation file, an executable file, a configuration file, a library file and/or the like. In another embodiment, the application block 118 may be a portion of a text file, a multimedia file, a video file, an audio file, an image file and/or the like.

The client 104 is a type of computing device (e.g., a laptop, a desktop, a Personal Digital Assistant (PDA), a mobile phone and/or the like), such as those generally known in the art. The client 104 includes a Central Processing Unit (CPU) 120, various support circuits 122 and a memory 124. The CPU 120 may comprise one or more commercially available microprocessors or microcontrollers that facilitate data processing and storage. The support circuits 122 facilitate the operation of the CPU 120 and include one or more clock circuits, power supplies, cache, input/output circuits, and the like. The memory 124 comprises at least one of Read Only Memory (ROM), Random Access Memory (RAM), disk drive storage, optical storage, removable storage and/or the like. The memory 124 includes various data, such as a data chunk 126 and location information 130. Furthermore, the memory 124 includes various software packages, such as streaming software 128 that is configured to assemble application blocks using a peer-to-peer protocol to facilitate application streaming.

Similarly, the client 106 is a type of computing device (e.g., a laptop, a desktop, a Personal Digital Assistant (PDA) and/or the like), such as those generally known in the art. The client 106 includes various data, such as a data chunk 132. The data chunk 132 constitutes a portion of a plurality of data chunks. As explained further below, the plurality of data chunks that form the application block 118 are communicated amongst a plurality of clients that require the application block 118 to update, install and/or operate an application (e.g., an application feature).

The network 108 comprises a communication system that connects computers by wire, cable, fiber optic and/or wireless link facilitated by various types of well-known network elements, such as hubs, switches, routers and the like. The network 108 may employ various well-known protocols to communicate information amongst the network resources. For example, the network 108 may be a part of the Internet or Intranet using various communications infrastructure, such as Ethernet, WiFi, WiMax, General Packet Radio Service (GPRS) and the like.

According to various embodiments, the server 102 is designed to provide various on-demand application services (e.g., application streaming) to the plurality of clients, such as the client 104 and the client 106. Generally, the plurality of clients request application blocks, such as the application block 118, to be streamed from the server 102. For example, the plurality of clients (e.g., web development computers) may utilize a particular tool for an application (e.g., a word processing application, a web publishing application and/or the like). As a result, the plurality of clients may simultaneously request one or more identical blocks associated with the particular tool to be streamed from the server 102.

In one embodiment, the plurality of clients within the peer-to-peer network may communicate a request to the server 102 for application blocks that are required for performing one or more operations (e.g., an update, a patch installation, initiation, process execution and/or the like) for an application. For example, the client 104 and/or the client 106 may communicate a request for the application block 118 to be streamed. In response, the CPU 110 executes the manager 116 stored in the memory 114. Accordingly, the manager 116 processes the request and partitions the application block 118 into the one or more data chunks (e.g., the data chunk 126 and the data chunk 132). Subsequently, the manager 116 distributes the application block 118 by communicating the one or more data chunks amongst the plurality of clients, such as the client 104, the client 106. For example, the manager 116 communicates the data chunk 126 and the data chunk 132 to the client 104 and the client 106, respectively. Additionally, the manager 116 communicates the location information 130 to the client 104 and/or the client 106. Subsequently, the streaming software 128 stores the data chunk 126 as well as the location information in the memory 124.

According to various embodiments, the manager 116 examines the request and identifies the application block 118 that is to be streamed to the plurality of clients. In one embodiment, the manager 116 determines a number of the plurality of clients and partitions the application block 118 into the plurality of data chunks based on the number of the plurality of clients. For example, the manager 116 may communicate ten data chunks amongst ten clients. As such, each client of the plurality of clients includes a portion of the application block 118 in a form of a unique data chunk of the plurality of data chunks.

According to various embodiments, the manager 116 generates information regarding locations of the plurality of data chunks of the application block 118 amongst the plurality of client computers, such as the location information 130. For example, the location information 130 includes mappings between the plurality of clients and the plurality of data chunks. Subsequently, the manager 116 communicates the location information 130. For each and every data chunk of the plurality of data chunks, the location information 130 indicates an address that corresponds with a client of the plurality of clients according to one embodiment. For example, the location information 130 may include network addresses (e.g., Internet Protocol (IP) address and/or like) of the plurality of clients having one or more data chunks of the plurality of data chunks.

In operation, the manager 116 cooperates with the streaming software 128 to facilitate application streaming at the client 104 using the location information 130. In one embodiment, the manager 116 communicates the data chunk 126 and the data chunk 132 to the streaming software 128 within the client 104. For example, the streaming software 128 assembles and/or executes the application block 118 from the plurality of data chunks. In one embodiments, the streaming software 128 identifies one or more data chunks of the application block 118 that are absent (i.e., missing) at the client 104. For instance, the one or more absent data chunks may be required to assemble the application block 118 for execution by an application. In one embodiment, the streaming software 128 utilizes the location information 130 to identify one or more clients of the plurality of clients having the one or more absent data chunks of the application block 118. Subsequently, the streaming software 128 communicates a request to the one or more client computers for the one or more absent data chunks.

According to various embodiments, the streaming software 128 is configured to monitor and facilitate application streaming within the peer-to-peer network. As an example, the streaming software 128 examines the location information 130 and determines that the data chunk 132 is absent (i.e., missing) from the client 104. Subsequently, the streaming software 128 utilizes the location information 130 to identify the client 106 having the data chunk 132. In one embodiment, the client 104 receives the data chunk 132 from the client 106. Accordingly, the client 104 assembles the application block 118 from the data chunk 126 and the data chunk 132.

According to one or more embodiments, the plurality of clients may not communicate the absent data chunks of the application block 118 amongst each other due to errors such as, a communication failure, data error and/or the like. For example, the client 104 may not receive the data chunk 132 from the client 106. In another embodiment, the location information 130 may not indicate the locations of the absent data chunks (e.g., the data chunk 132). As a result, the streaming software 128 communicates a request for the absent data chunks to the server 102.

Figure 2:
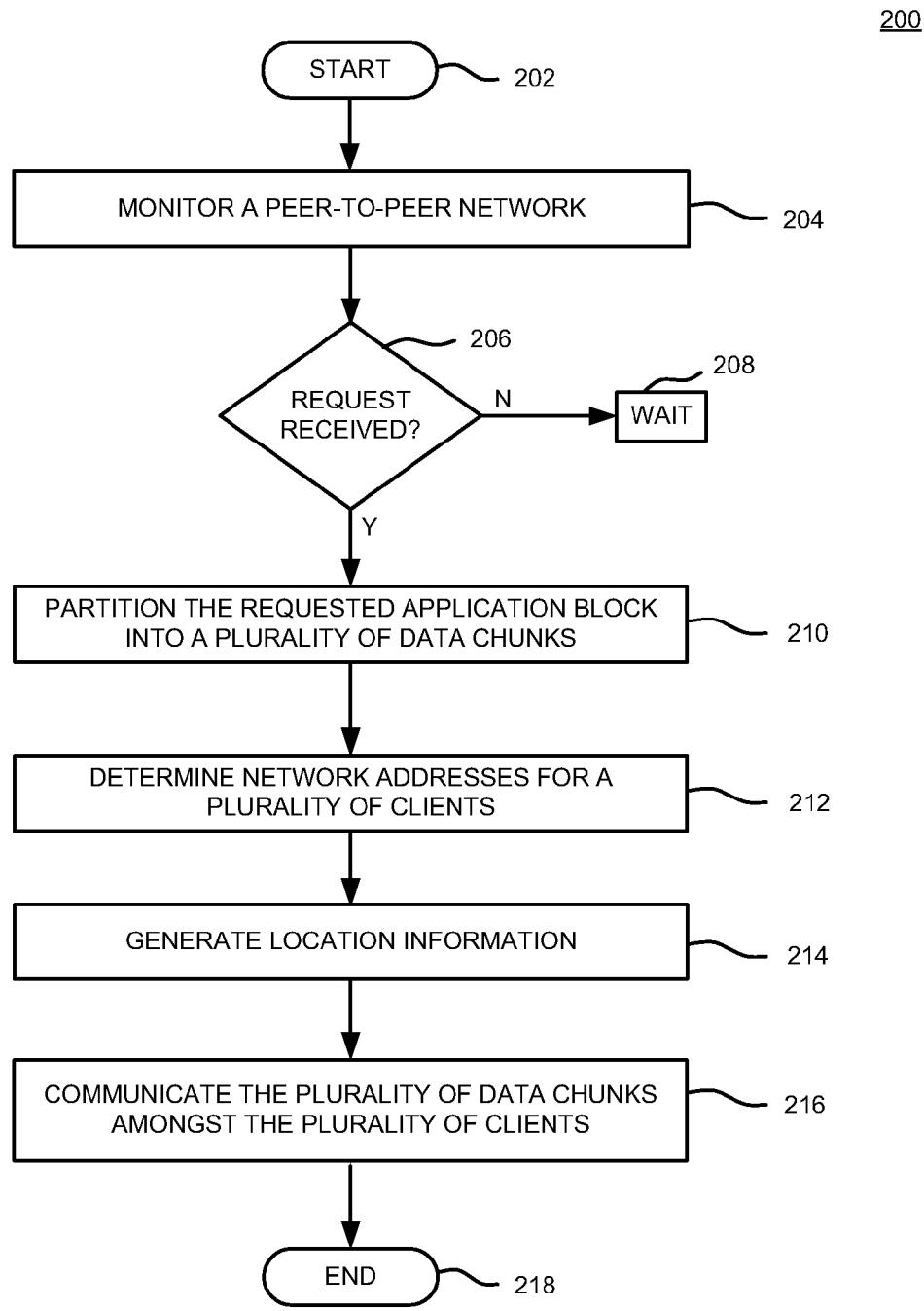
FIG. 2 is a flow diagram of a method for distributing application blocks to facilitate application streaming within a peer-to-peer network according to one or more embodiments of the invention.

FIG. 2 is a flow diagram of a method 200 for distributing application blocks to facilitate application streaming within a peer-to-peer network according to one or more embodiments. The method 200 starts at step 202 and proceeds to step 204, at which a peer-to-peer network is monitored. In one embodiment, a server (e.g., the server 102 of the FIG. 1) monitors a plurality of clients (e.g., the client 104, the client 106 of the FIG. 1) within the peer-to-peer network. In one or more embodiments, the server may monitor and/or maintain network addresses for the plurality of clients.

At step 206, a determination is made as to whether a request for an application block (e.g., the application block 118 of the FIG. 1) is received (e.g., at the server). If, it is determined that a request for an application block is not received (option "NO"), then the method 200 proceeds to step 208. At step 208, the method 200 waits for a definable time period until the request is received. If, it is determined that the request is received (option "YES"), then the method 200 proceeds to step 210. In one embodiment, the plurality of clients simultaneously communicates requests to the server.

At the step 210, the requested application block is partitioned into a plurality of data chunks (e.g., the data chunk 126 and the data chunk 132 of FIG. 1). At step 212, network addresses for the plurality of clients are determined. In another embodiment, the server may select the plurality of clients in accordance with a policy. At step 214, location information (e.g., the location information 130 of the FIG. 1) is generated. In one embodiment, the location information indicates network addresses of the plurality of clients having one or more data chunks of the plurality of data chunks. At step 216, the plurality of data chunks are communicated to the plurality of clients. In one embodiment, the data chunks are communicated in accordance with the location information. The method 200 further proceeds to step 218. At the step 218, the method 200 ends.

Figure 3:
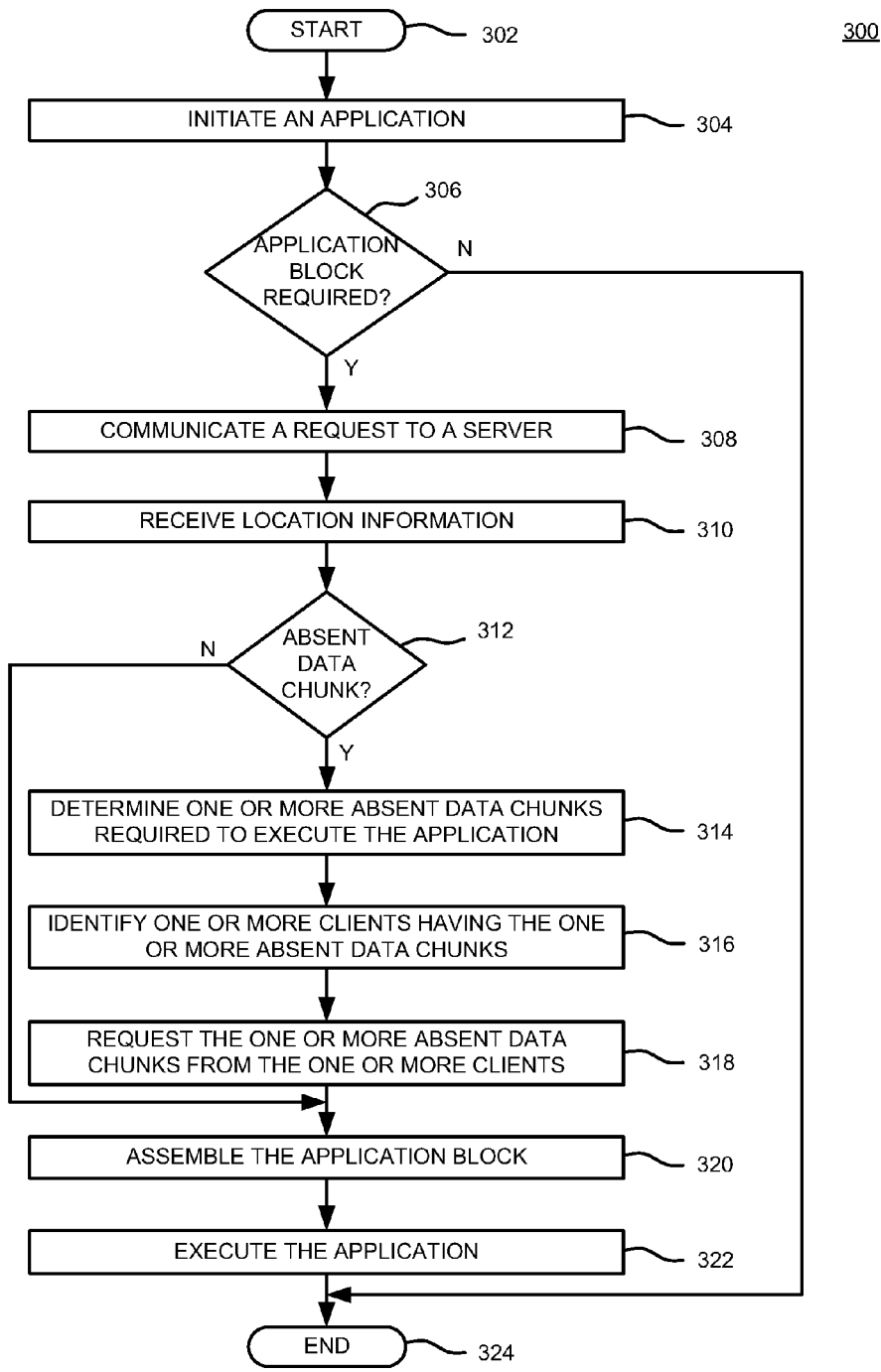
FIG. 3 is a flow diagram of a method for accessing data chunks using location information to execute an application according to one or more embodiments of the invention.

FIG. 3 is a flow diagram of a method 300 for accessing data chunks using location information to execute an application according to one or more embodiments of the invention. The method 300 starts at step 302 and proceeds to step 304, at which the application (e.g., a streaming application) is initiated at a client (e.g., the client 104 of the FIG. 1). In one embodiment, the client may initiate a feature of the application.

At step 306, a determination is made as to whether an application block is required at the client. For example, the application block may be required to execute the application. As such, the application data block is streamed to the client. If, it is determined that the application data block is not required (option "NO"), then the method 300 proceeds to step 324. If, it is determined that the application block is required (option "YES"), then the method 300 proceeds to step 308. At the step 308, a request is communicated to a server (e.g., the server 102 of the FIG. 1). At step 310, location information (e.g., the location information 130 of the FIG. 1) is received regarding a plurality of data chunks that form the application block. Furthermore, one or more data chunks of the plurality of data chunks may also be communicated to the client according to one embodiment.

At step 312, a determination is made as to whether there are any absent data chunks for the application block. If, it is determined that there are no absent data chunks for the application block (option "NO"), then the method 300 proceeds to step 320. If, it is determined that there are absent data chunks of the requested application block (option "Yes"), then the method 300 proceeds to step 314. At the step 314, at least one data chunk required to execute the application (e.g., or a feature thereof) is identified. In one embodiment, streaming software (e.g., the streaming software 128 of the FIG. 1) uses the location information to determine one or more absent data chunks associated with the application block. At step 316, one or more clients having the one or more absent data chunks are identified. At step 318, the one or more absent data chunk are requested from the one or more clients. At the step 320, the application block is assembled from the one or more absent data chunks. At the step 322, the application is executed. The method 300 proceeds to step 324, at which the method 300 ends.

While the foregoing is directed to embodiments of the present invention, other and further embodiments of the invention may be devised without departing from the basic scope thereof, and the scope thereof is determined by the claims that follow.

The invention claimed is:

1. A method for distributing application blocks to facilitate application streaming within a peer-to-peer network, comprising:
   determining that an application block is needed by a client of a plurality of clients based at least in part on execution needs of the client, wherein the execution needs of the client comprise initiation of a feature of an application;
   processing location information, using at least one computer processor of a server, regarding a plurality of data chunks amongst the plurality of clients, wherein the plurality of data chunks form at least a portion of the application block, and wherein processing the location information further comprises selecting a client of the plurality of clients to receive a data chunk of the plurality of data chunks, wherein the server is configured to provide on-demand application services to the plurality of clients, and wherein the server communicates a unique data chunk of the plurality of data chunks to each client of the plurality of clients; and
   communicating the location information from the server to the plurality of clients, wherein the location information is used to request at least one data chunk of the plurality of data chunks.

2. The method of claim 1 further comprising partitioning the at least a portion of the application block into the plurality of data chunks based on the plurality of clients.

3. The method of claim 1, wherein processing the location information further comprising mapping the plurality of clients to the plurality of data chunks.

4. The method of claim 1 further comprising assembling the at least a portion of the application block from the plurality of data chunks using the location information.

5. The method of claim 1, wherein a client of the plurality of clients uses the location information to assemble the at least a portion of an application block from the plurality of data chunks.

6. The method of claim 1, wherein a client of the plurality of clients requests the at least one data chunk of the plurality of data chunks from the at least one client of the plurality of clients using the location information and assembles the at least a portion of the application block.

7. The method of claim 1, wherein a client of the plurality of clients determines at least one absent data chunk of the plurality of data chunks.

8. The method of claim 7, wherein the client of the plurality of clients identifies the at least one client of the plurality of clients having the at least one absent data chunk of the plurality of data chunks.

9. The method of claim 8, wherein the clients requests the at least one absent data chunk from the at least one client having the at least one absent data chunk.

10. The method of claim 9, wherein the client of the plurality of clients assembles the at least a portion of the application block from the at least one absent data chunk.

11. The method of claim 8 further comprising processing a request for the at least one absent data chunk of the plurality of data chunks.

12. The method of claim 1 further comprising communicating at least one of the location information or the at least one absent data chunk to the client of the plurality of clients.

13. The method of claim 1, wherein the location information comprises a network address associated with each client of the plurality of clients having at least one data chunk of the plurality of data chunks.

14. An apparatus for distributing application blocks to facilitate application streaming within a peer-to-peer network, comprising:
- a memory comprising location information regarding a plurality of data chunks amongst a plurality of clients, wherein the plurality of data chunks form at least a portion of an application block; and
- a manager for determining that the application block is needed by a client of the plurality of clients based at least in part on execution needs of the client and for communicating the location information from the manager to the plurality of clients, wherein the execution needs of the client comprise initiation of a feature of an application, wherein the location information is used to request at least one data chunk of the plurality of data chunks, and wherein the manager is configured to select a client of the plurality of clients to receive a data chunk of the plurality of data chunks, wherein the manager is configured to provide on-demand application services to the plurality of clients, and wherein the manager communicates a unique data chunk of the plurality of data chunks to each client of the plurality of clients.

15. The apparatus of claim 14, wherein the manager partitions the at least the portion of the application block into the plurality of data chunks.

16. The apparatus of claim 14 further comprising streaming software for assembling the at least the portion of the application block from the plurality of data chunks using the location information.

17. The apparatus of claim 16, wherein the streaming software examines the location information to determine at least one absent data chunk of the application block at a client of the plurality of clients and identify the at least one client of the plurality of clients having the at least one absent data chunk.

18. A system for distributing the application blocks to facilitate application streaming within a peer-to-peer, comprising:
- a server, comprising:
    - a manager for determining that an application block is needed by a client of a plurality of clients based at least in part on execution needs of the client and for generating location information regarding the plurality of data chunks amongst a plurality of clients, wherein the execution needs of the client comprise initiation of a feature of an application, wherein the plurality of data chunks form at least a portion of the application block and communicating the location information from the manager to the plurality of clients, and wherein the manager is configured to select a client of the plurality of clients to receive a data chunk of the plurality of data chunks, wherein the manager is configured to provide on-demand application services to the plurality of clients, and wherein the manager communicates a unique data chunk of the plurality of data chunks to each client of the plurality of clients; and
- a client of the plurality of clients and coupled to the server, comprising:
    - streaming software for examining the location information to request at least one data chunk of the plurality of data chunks from at least one client of the plurality of clients.

19. The system of claim 18, wherein the streaming software assembles the at least a portion of the application block from the plurality of data chunks.

* * * * *